(12) United States Patent
Nakamura et al.

(10) Patent No.: US 10,247,309 B2
(45) Date of Patent: Apr. 2, 2019

(54) MECHANICAL SEAL DEVICE FOR USE IN WATER ENVIRONMENT AND SEALING RING THEREOF

(71) Applicant: Eagle Industry Co., Ltd., Tokyo (JP)

(72) Inventors: Keitaro Nakamura, Tokyo (JP); Hitoshi Suzuki, Tokyo (JP); Haruhiro Osada, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/548,400

(22) PCT Filed: Mar. 3, 2016

(86) PCT No.: PCT/JP2016/056564
§ 371 (c)(1),
(2) Date: Aug. 2, 2017

(87) PCT Pub. No.: WO2016/152437
PCT Pub. Date: Sep. 29, 2016

(65) Prior Publication Data
US 2018/0038487 A1     Feb. 8, 2018

(30) Foreign Application Priority Data

Mar. 20, 2015 (JP) .................................. 2015-057693

(51) Int. Cl.
*F16J 15/34* (2006.01)
*C04B 35/565* (2006.01)
(Continued)

(52) U.S. Cl.
CPC ......... *F16J 15/3484* (2013.01); *C04B 35/565* (2013.01); *C04B 35/6261* (2013.01);
(Continued)

(58) Field of Classification Search
CPC ...... F16J 15/3484; F16J 15/34; F16J 15/3404; C04B 35/565; C04B 38/0054; C04B 2235/3826
See application file for complete search history.

(56) References Cited

U.S. PATENT DOCUMENTS

| | | | |
|---|---|---|---|
| 5,080,378 A | 1/1992 | Kagawa | ........................ 277/96 |
| 2009/0060408 A1* | 3/2009 | Nagasaka | ............ C04B 41/009 384/625 |

(Continued)

FOREIGN PATENT DOCUMENTS

| | | | |
|---|---|---|---|
| CN | 101663495 | 3/2010 | ............ C23C 16/26 |
| JP | H0569066 | 9/1993 | ........... C04B 35/565 |

(Continued)

OTHER PUBLICATIONS

International Search Report (w/translation) and Written Opinion (no translation) issued in application No. PCT/JP2016/056564, dated Apr. 12, 2016 (7 pgs).

(Continued)

*Primary Examiner* — Gilbert Y Lee
(74) *Attorney, Agent, or Firm* — Hayes Soloway P.C.

(57) ABSTRACT

A mechanical seal device for use in a water environment includes: a stationary sealing ring made of SiC; and a rotating sealing ring made of SiC and arranged opposite to the stationary sealing ring, the mechanical seal device bringing opposite sliding surfaces of the stationary sealing ring and the rotating sealing ring into close contact with each other to seal a sealed fluid, wherein at least one of the sealing rings including the sliding surfaces is configured by a sintered compact of a material including SiC as a base material compounded with an Al additive, and a specific (Continued)

resistance value of the sealing ring configured by the sintered compact including the sliding surface is equal to or lower than 100 Ω·cm.

15 Claims, 3 Drawing Sheets

(51) Int. Cl.
*C04B 38/00* (2006.01)
*C04B 35/626* (2006.01)
*C04B 35/634* (2006.01)

(52) U.S. Cl.
CPC .... *C04B 35/6263* (2013.01); *C04B 35/62655* (2013.01); *C04B 35/63476* (2013.01); *C04B 38/0054* (2013.01); *F16J 15/3404* (2013.01); *C04B 2235/3217* (2013.01); *C04B 2235/3821* (2013.01); *C04B 2235/3826* (2013.01); *C04B 2235/422* (2013.01); *C04B 2235/48* (2013.01); *C04B 2235/5436* (2013.01); *C04B 2235/5445* (2013.01); *C04B 2235/658* (2013.01); *C04B 2235/6567* (2013.01); *C04B 2235/76* (2013.01); *C04B 2235/963* (2013.01)

(56) References Cited

U.S. PATENT DOCUMENTS

| 2010/0061676 | A1 | 3/2010 | Sugiyama et al. | 384/625 |
| 2010/0224877 | A1* | 9/2010 | Ishii | C23C 16/24 |
| | | | | 257/53 |
| 2015/0291905 | A1 | 10/2015 | Takahashi et al. | C10M 125/26 |

FOREIGN PATENT DOCUMENTS

| JP | 2008025597 | 2/2008 | F16L 27/08 |
| JP | 2010173927 | 8/2010 | C04B 35/565 |
| JP | 5148523 | 12/2012 | C04B 35/565 |
| WO | WO2014168112 | 10/2014 | C04B 35/80 |

OTHER PUBLICATIONS

International Preliminary Report on Patentability and English translation of Written Opinion issued in application No. PCT/JP2016/056564, dated Oct. 5, 2017 (7 pgs).
European Search Report issued in application No. 16768340, dated Nov. 19, 2018 (6 pgs).
Chinese Office Action (w/translation) issued in application No. 201680008558.1, dated Jun. 19, 2018 (13 pgs).

* cited by examiner

MECHANICAL SEAL DEVICE FOR USE IN WATER ENVIRONMENT AND SEALING RING THEREOF

TECHNICAL FIELD

The present invention relates to a mechanical seal device for use in a water environment and a sealing ring thereof, the mechanical seal device bringing opposite sliding surfaces of a stationary sealing ring and a rotating sealing ring arranged opposite to the stationary sealing ring, into close contact with each other to seal a sealed fluid.

BACKGROUND ART

In a mechanical seal device, various materials are applied in accordance with the intended use, to opposite sliding surfaces of a stationary sealing ring and a rotating sealing ring arranged opposite to the stationary sealing ring.

In a usage where contamination is particularly unfavorable, silicon carbide (SiC) that is less likely to cause wear is applied as a material for the sealing rings. Likewise, the aforementioned sealing rings made of SiC are adopted to stationary and rotating sealing rings of a mechanical seal to be used in a semiconductor manufacturing factory, a nuclear power related facility, or the like where for example, ultrapure water or pure water is used for clearing or cooling. However, a phenomenon where silicon dioxide ($SiO_2$) accumulates on sliding surfaces of both of the sealing rings to cause surface whitening of the sliding surfaces has been confirmed.

$SiO_2$ becomes a source of contamination of a sealed fluid, and in addition, due to the accumulation of $SiO_2$, a deterioration of sealing performance of the sliding surfaces or a defect such as an occurrence of chipping or surface roughness of the sliding surfaces has been confirmed. The mechanism of chipping or surface roughness has not been precisely solved; however, these have been proved from studies of the inventors to be associated with the accumulation of $SiO_2$ on the sliding surfaces.

The accumulation of $SiO_2$, regarded as a factor for abnormal wear of the sliding surfaces is considered to be attributed to a high specific resistance value (equal to or higher than 4 M$\Omega$·cm) of ultrapure water, pure water, or the like. Patent Citation 1 proposes a technique in which a SiC film having a specific resistance value of equal to or lower than 1 $\Omega$·cm is deposited by chemical vapor deposition on a sliding surface of one of stationary and rotating sealing rings or on sliding surfaces of both of the sealing rings in order to prevent $SiO_2$ from accumulating on the sliding surfaces.

CITATION LIST

Patent Literature

Patent Citation 1: Japanese Unexamined Patent Application Publication No. 2008-25597 (paragraphs 0024, 0027, 0031 and FIGS. 2 and 3)

SUMMARY OF INVENTION

Technical Problem

In the foregoing Patent Citation 1, a SiC film having a low specific resistance value of 20 $\Omega$·cm is deposited by chemical vapor deposition with a film thickness of 50 μm on the sealing ring made of SiC of a sintered compact having a high specific resistance value. However, even with the SiC film with a small film thickness, deposited by chemical vapor deposition as disclosed in Patent Citation 1, due to the accumulation of $SiO_2$, a deterioration of sealing performance of the sliding surfaces or a defect such as an occurrence of chipping or surface roughness of the sliding surfaces has not been sufficiently solved yet.

Such problem may be attributed to the fact that the SiC film deposited by chemical vapor deposition has limited thickness for its manufacturing method. In addition, a passage section of a conductive path is narrow depending on the quantity of electric charge generated on a sliding portion and therefore the electric charge generated on the sliding portion cannot be promptly released. Consequently, adhesion of $SiO_2$ may not be adequately inhibited. In particular, depending on a position of the SiC film deposited by chemical vapor deposition, releasing of the electric charge from the conductive path is limited and the adhesion of $SiO_2$ may significantly occur.

The present invention is made in view of the foregoing problem, and it is an object of the present invention to provide a mechanical seal device and a sealing ring thereof that can inhibit the adhesion of $SiO_2$ on the sealing ring made of SiC as much as possible even if the device is used in a water environment of ultrapure water, pure water, or the like, and that can stably maintain a sealing effect for a long period of time.

Solution to Problem

In order to solve the foregoing problem, in a first aspect of the present invention a mechanical seal device for use in a water environment, is characterized by including: a stationary sealing ring made of SiC; and a rotating sealing ring made of SiC and arranged opposite to the stationary sealing ring, the mechanical seal device bringing opposite sliding surfaces of the stationary sealing ring and the rotating sealing ring into close contact with each other to seal a sealed fluid such as ultrapure water or pure water that has a high specific resistance value, wherein at least one of the sealing rings including the sliding surfaces is configured by a sintered compact of a material including SiC as a base material compounded with an Al additive, and a specific resistance value of the sealing ring of SiC including the sliding surface is equal to or lower than 100 $\Omega$·cm.

According to the first aspect, the sealing ring including the sliding surface is integrally configured by the sintered compact of the material including SiC compounded with the Al additive. Accordingly, the sealing ring itself functions as a high-capacity conducting medium that has a low specific resistance equal to or lower than 100 $\Omega$·cm; therefore, electric charge is less likely to accumulate on the sliding surface. Consequently, adhesion of $SiO_2$ to the sliding surface or a portion adjacent to the sliding surface and corrosion of the sliding surface due to an electrochemical reaction are inhibited. As a result, a preferable sealing performance can be secured for a long period of time.

The mechanical seal device in a second aspect of the present invention is characterized in that the sealing ring including SiC is configured so that a rate of a 4H-polytype crystal structure included in the sliding surface is 15% or more relative thereto.

According to the second aspect, the specific resistance value of the sealing ring can be reduced; therefore, even if being used in the water environment, the ring can secure the preferable sealing performance without the occurrence of the accumulation on the sliding surface.

The mechanical seal device in a third aspect of the present invention is characterized in that the sealing ring is made of SiC including a 15R-polytype crystal structure.

According to the third aspect, the specific resistance value of the sealing ring can be reduced; therefore, even if being used in the water environment, the ring can secure the preferable sealing performance without the occurrence of the accumulation on the sliding surface.

The mechanical seal device in a fourth aspect of the present invention is characterized by including: a sealing ring main body including the sliding surface of the stationary sealing ring; and a sealing ring main body including the sliding surface of the rotating sealing ring, wherein each of the sealing ring main bodies is configured by a sintered compact of a material including SiC as a base material compounded with an Al additive.

According to the fourth aspect, the sealing ring main bodies collaborate with each other to function as the high-capacity conducting medium with respect to the electric charge generated on the sliding surfaces; therefore, the adhesion of $SiO_2$ to the sealing rings made of SiC can be inhibited as much as possible. In addition, the sealing ring main body comprises a main member of the sealing ring provided with the sliding surface, and the sealing ring may be configured only by the main member of the sealing ring or may be configured by, in addition to the main member of the sealing ring, at least one member different from the main member.

The mechanical seal device in a fifth aspect of the present invention is characterized in that at least one of the sealing rings is configured so that pores having an average diameter of 10 μm to 60 μm are exposed on the sliding surface of the sintered compact.

According to the fifth aspect, minute pores are exposed on the sliding surface; therefore, the sealed fluid, a lubricating agent, or the like penetrates into the pores. Thus, a lubricating effect increases.

The mechanical seal device in a sixth aspect of the present invention is characterized in that at least one of the sealing rings is configured so that the Al additive is aluminum oxide particles having an average diameter of 10 μm to 60 μm.

According to the sixth aspect, due to the Al additive, pores having an average diameter of 10 μm to 60 μm are formed on the sliding surface. The minute pores are exposed on the sliding surface; therefore, the sealed fluid, the lubricating agent, or the like penetrates into the pores. Thus, the lubricating effect increases.

The mechanical seal device in a seventh aspect of the present invention is characterized in that the sealing ring is the sintered compact of a material compounded with a source B of 0.05 wt % to 0.5 wt %, a source C of 1.0 wt % to 3.0 wt %, the Al additive of 0.25 wt % to 1.25 wt %, predetermined volumes of a binding agent, a dispersing agent and a parting agent, and SiC as a residual portion.

According to the seventh aspect, the specific resistance value of the sealing ring is low and is equal to or lower than 100 Ω·cm; therefore, even if the sealing ring is used in the water environment, white deposition of $SiO_2$ is less likely to occur. Therefore, the preferable sealing performance can be secured.

A sealing ring including a sliding surface in an eighth aspect of the present invention is configured by a sintered compact of a material including SiC compounded with an Al additive, wherein a specific resistance value of the sealing ring including the sliding surface is equal to or lower than 100 Ω·cm.

According to the eighth aspect, the sealing ring including the sliding surface is the sintered compact of the material including SiC compounded with the Al additive. Accordingly, the sealing ring itself functions as the high-capacity conducting medium that has a low specific resistance equal to or lower than 100 Ω·cm; therefore, electric charge is less likely to accumulate on the sliding surface.

Consequently, adhesion of $SiO_2$ to the sliding surface or a portion adjacent to the sliding surface and corrosion of the sliding surface due to an electrochemical reaction are inhibited. As a result, the preferable sealing performance can be secured for a long period of time.

BRIEF DESCRIPTION OF DRAWINGS

FIG. 3(a)-3(c) illustrates images, captured by the scanning electron microscope (SEM), of a sliding surface of a sealing ring of a specimen B.

DESCRIPTION OF EMBODIMENTS

A mechanical seal device for use in a water environment and a sealing ring thereof according to the present invention will be described hereinafter on the basis of embodiments.

Compositions A to C of materials for manufacturing the sealing rings of the mechanical seal device will be explained. The respective compositions are as follows.

Composition A
Main component: silicon carbide fine powder (average particle diameter: 0.7 μm, purity 97%), residual portion
Source B: boron carbide fine powder (average particle diameter: 0.6 μm), 0.14 wt %
Source C: water-soluble phenol resin, 2.0 wt %
Al additive: aluminum oxide powder, 0.5 wt %, average particle diameter 0.5 μm
Others: predetermined volumes of binding agent, dispersing agent, and parting agent Composition B
Main component: silicon carbide fine powder (average particle diameter: 0.7 μm, purity 97%), residual portion
Source B: boron carbide fine powder (average particle diameter: 0.6 μm), 0.14 wt %
Source C: water-soluble phenol resin, 2.0 wt %
Al additive: aluminum oxide powder, 1.0 wt %, average particle diameter 2.0 μm
Others: predetermined volumes of binding agent, dispersing agent, and parting agent Composition C
Main component: silicon carbide fine powder (average particle diameter: 0.7 μm, purity 97%), residual portion
Source B: boron carbide fine powder (average particle diameter: 0.6 μm), 0.14 wt %
Source C: water-soluble phenol resin, 2.0 wt %
Others: predetermined volumes of binding agent, dispersing agent, and parting agent Compounding raw materials of the compositions A to C are loaded in a vibrating mill and mixed for two hours to form slurry. This slurry is spray-dried to form silicon carbide granular particles. Next, these granular particles are filled in respective molds to be molded into shapes of the sealing rings (stationary sealing ring and rotating sealing ring). The molded sealing rings are degreased and are thereafter sintered in an Ar (argon) atmosphere at 2100 degrees Celsius for two hours. Surfaces of the obtained sintered compacts, which are to be sliding surfaces are processed by lapping so as to have surface roughness Ra of 0.08 μm. Thus, specimens A to C are obtained.

Figure 2:
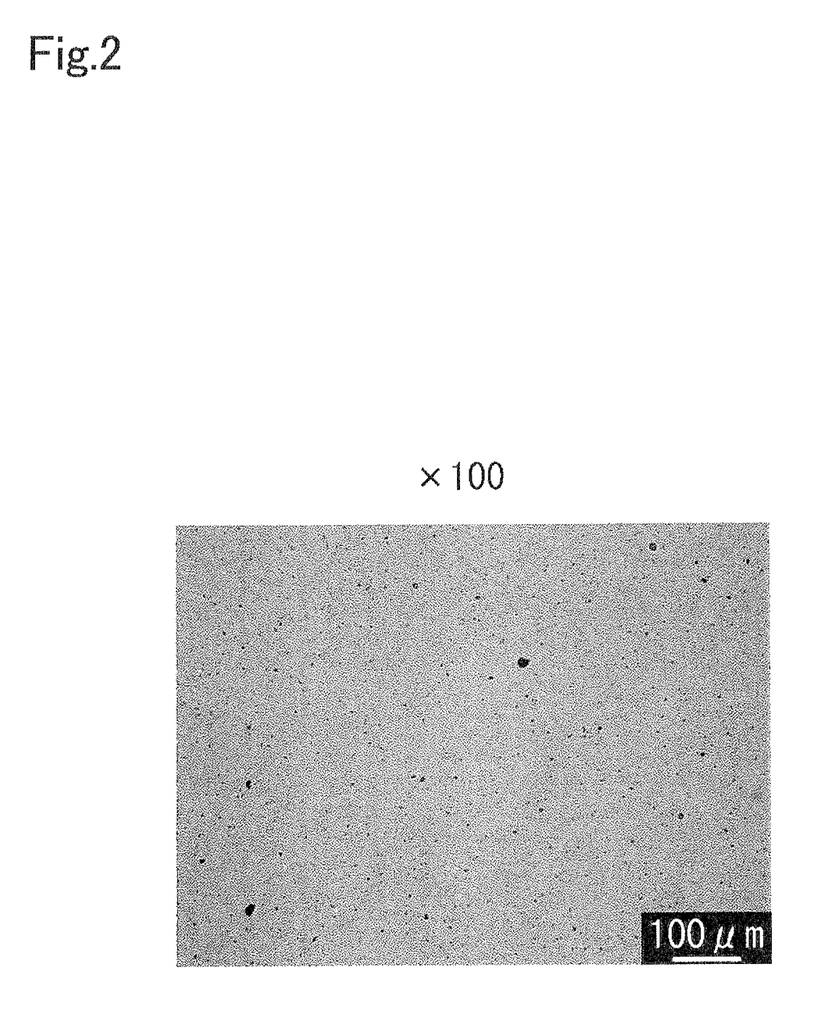
FIG. 2 illustrates an image, captured by a scanning electron microscope (SEM), of a sliding surface of a sealing ring of a specimen A.
Figure 3:
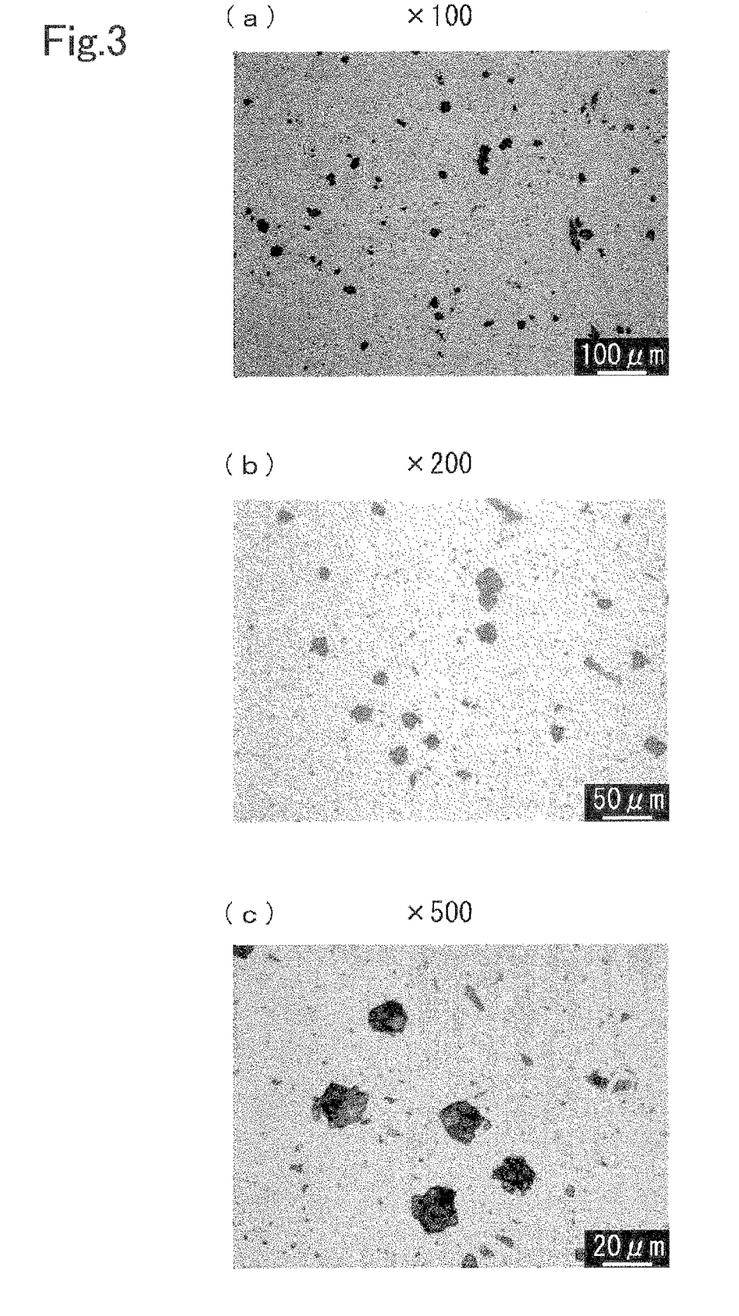

As shown in an image of FIG. 2, which is captured by a scanning electron microscope (SEM), it has been observed in the specimen A that on the sliding surface processed by lapping, approximately one or two pores having an average diameter of 20 μm are distributed in an approximately 500 μm×500 μm square. That is, an open porosity is below 1.0%. As shown in images of FIGS. 3A, 3B, 3C, which are captured by the SEM, it has been observed in the specimen B that on the sliding surface processed by lapping, approximately one or two pores having an average diameter of 20 μm are distributed in an approximately 100 μm×100 μm square. That is, an open porosity is within a range from 1.0% to 5.0%. A microscope is used to be set at 100-fold magnification and images of the sliding surface are captured by a CCD camera, and an image analyzing system ("Azokun" manufactured by Asahi Kasei Engineering Corporation) is used with the measuring area of one field of view in the image set at $9.0 \times 10^{-2}$ mm$^2$ and the number of fields of view set at 10, namely, the total measuring area of $9.0 \times 10^{-1}$ mm$^2$; thereby, the open porosity may be measured as a rate of the area of all open pores occupied in the total measuring area.

Further, the presence or absence of pores is determined based on the presence or absence of the open pores of 0.5 μm or more diameters in a 100 μm×100 μm square. In the specimen B in which the sintered compact includes pores, the porosity measured in accordance with J151634 is 5 vol %. Meanwhile, in the specimen A and the specimen C, the porosity is 0 vol %.

Furthermore, according to a ratio of the area of crystal structures measured to the area of the sliding surface, it has been confirmed that many 4H-polytype crystal structures are included in SiC within the compositions A and B.

The contents of components of the compositions A to C and the specimens A to C, and pores and SiC crystal structures are listed in Table 1.

Figure 1:
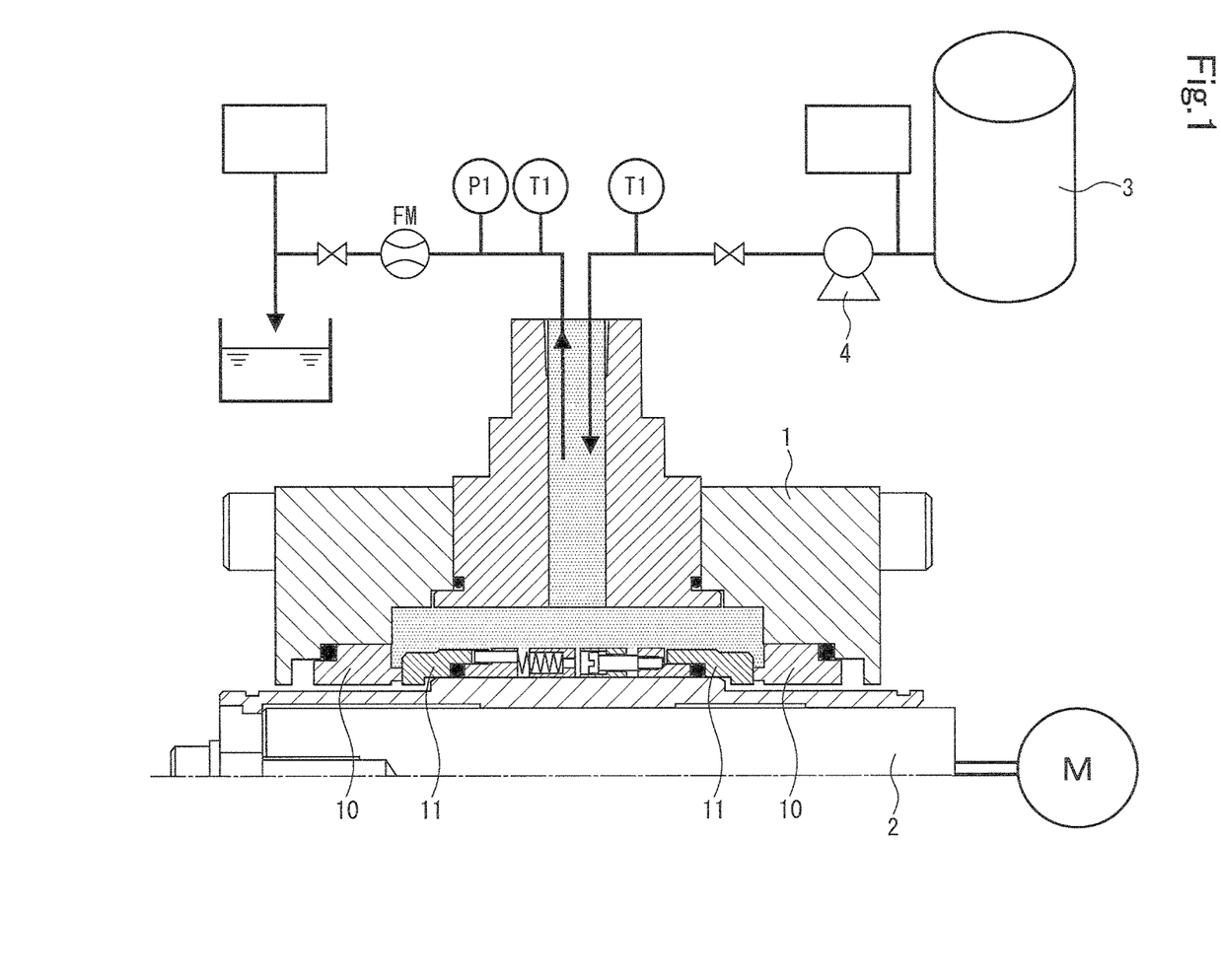
FIG. 1 is a schematic view of a test equipment for evaluating sealing performance of a mechanical seal device.

10 has an outer diameter of 66 mm, an inner diameter of 59 mm, and an axial length of 3 mm. The rotating sealing ring 11 formed by sintering in the same way as the ring 10 includes: a sliding portion having an outer diameter of 75 mm, an inner diameter of 56 mm, and an axial length of 10 mm; and an intermediate portion having an outer diameter of 77 mm, an inner diameter of 69 mm, and an axial length of 17 mm. A secondary sliding portion of the ring 11, which is axially opposite to the former sliding portion as a primary has an outer diameter of 77 mm, an inner diameter of 69 mm, and an axial length 27 mm.

In the rotating sealing ring formed into the shape just described, a specific resistance value of the sintered compact of the composition A, a specific resistance value of the sintered compact of the composition B, and a specific resistance value of the sintered compact of the composition C are respectively 17 Ω·cm, 29 Ω·cm, and $1.0 \times 10^8$ Ω·cm. Likewise, in the stationary sealing ring, a specific resistance value of the sintered compact of the composition A, a specific resistance value of the sintered compact of the composition B, and a specific resistance value of the sintered compact of the composition C are respectively 6 Ω·cm, 14 Ω·cm, and $1.0 \times 10^8$ Ω·cm.

The result above shows that a ratio of the area of 4H-polytype crystal structures to the area of the sliding surface is equal to or higher than 15%, preferably equal to or higher than 25%, further preferably equal to or higher than 40%. Further, in addition to the 4H-polytype crystal structures, it is preferable that 15R-polytype crystal structures may be included in the sliding surface.

As first and second embodiments and first to third comparative examples, the rotating sealing ring and the stationary sealing ring are tested by the combination of the sintered compacts of the following compositions.

[First embodiment] Rotating and stationary sealing rings configured by the sintered compacts of the composition A

[Second embodiment] Rotating and stationary sealing rings configured by the sintered compacts of the composition B

[First comparative example] Rotating and stationary sealing rings configured by the sintered compacts of the composition C

TABLE 1

| | Component (wt %) | | | | Pore | | | SiC crystal structure | | |
| | | | | | Presence | Average | | Crystal rate (%) | | |
| | Source B | Source C | Source Al | SiC | or Absence | diameter (μm) | Volume (vol %) | 4H | 6H | 15R |
|---|---|---|---|---|---|---|---|---|---|---|
| Composition A | 0.14 | 2.0 | 0.5 | Residual | Specimen A Absence | Absence | Absence | 40.5 | 56.4 | 3.1 |
| Composition B | 0.14 | 2.0 | 0.5 | Residual | Specimen B Presence | 20 | 5 | 47.5 | 48.1 | 4.4 |
| Composition C | 0.14 | 2.0 | 0.0 | Residual | Specimen C Absence | Absence | Absence | 8.2 | 91.8 | — |

Using the stationary sealing ring and the rotating sealing ring that are obtained as described above, a test equipment shown in FIG. 1 is used to evaluate the performance of the mechanical seal device. Test conditions will be described below. The test equipment is configured by stationary sealing rings 10, 10 fixed to a housing 1, rotating sealing rings 11, 11 fixed to a shaft 2, and an injection pump 4 which supplies pure water from a tank 3 into the housing 1.

The stationary sealing ring 10 formed by sintering has an outer diameter of 81 mm, an inner diameter of 56 mm, and an axial length of 27 mm, and a sliding protrusion of the ring

[Second comparative example] Rotating sealing ring configured by the sintered compact of the composition A and stationary sealing ring configured by the sintered compact of the composition C

[Third comparative example] Rotating sealing ring configured by the sintered compact of the composition B and stationary sealing ring configured by the sintered compact of the composition C

[Test Conditions]
Sealed liquid: ultrapure water
Liquid temperature: 20° C.

Fluid pressure: 0.3 MPa
Number of rotations of shaft: 1800 rpm
Evaluation time: 20 hours
[Evaluation Method]

The test is conducted in accordance with the aforementioned test conditions; thereafter, whether or not $SiO_2$ is accumulated on the sliding surfaces of the rotating sealing ring and the stationary sealing ring from the test equipment is observed with the microscope. In addition, the ultrapure water that has leaked to the outer side of the test equipment during the test is collected and the leakage quantity is measured.

The test result is listed in Table 2.

TABLE 2

|  | Rotating sealing ring | | Stationary sealing ring | | | |
| --- | --- | --- | --- | --- | --- | --- |
|  | Composition | Specific resistance value [Ω · cm] | Composition | Specific resistance value [Ω · cm] | Leakage quantity [ml] | Change on sliding surface |
| First embodiment | A | 17 | A | 6 | 0 | No change |
| Second embodiment | B | 29 | B | 14 | 0 | No change |
| First comparative example | C | $1.0 \times 10^8$ | C | $1.0 \times 10^8$ | 38.6 | $SiO_2$ accumulated |
| Second comparative example | A | 17 | C | $1.0 \times 10^8$ | Plenty | $SiO_2$ accumulated |
| Third comparative example | B | 29 | C | $1.0 \times 10^8$ | Plenty | $SiO_2$ accumulated |

As shown in FIG. 2, in the first and second embodiments where the specific resistance values of the rotating and stationary sealing rings are low, neither leakage nor changes on the sliding surfaces have been found. On the other hand, in the first comparative example where the specific resistance values of the rotating and stationary sealing rings are high, leakage has occurred and the accumulation of $SiO_2$ has been found. In addition, in the second and third comparative examples where the specific resistance value of the rotating sealing ring is low and the specific resistance value of the stationary sealing ring is high, the leakage quantity is large and the accumulation of $SiO_2$ has been found.

When the specific resistance value of one of the sealing rings is high, the accumulation of $SiO_2$ has been found; therefore, it has been turned out that the ring is undesirable to be a sealing member. Further, as in the second and third comparative examples, it has been turned out that the leakage quantity is large in a case where the rotating sealing ring having a low specific resistance value is combined with the stationary sealing ring having a high specific resistance value. Although a reason of the large leakage quantity is not clear, electric charge (electron) moves from the stationary sealing ring having the high specific resistance value through the sliding portion to the rotating sealing ring having the low specific resistance value and therefore such movement is assumed to exert some influence on the large leakage quantity.

Thus, it is preferable that if sintered compacts each having a low specific resistance value of equal to or lower than 100 Ω·cm are applied to the rotating and stationary sealing rings, neither leakage nor accumulation of $SiO_2$ occurs. Further, the sealing rings are manufactured by sintering; therefore, a chemical vapor deposition process is not required; therefore, a manufacturing process of the sealing rings is simple. Compared with a case where a chemical vapor deposition process is performed particularly to an inner surface or the like other than the sliding surfaces of the sealing rings, the manufacturing process by sintering is simple. Furthermore, the sintered compact itself having the low specific resistance value of equal to or lower than 100 Ω·cm is applied to each of the sealing rings; therefore, the entire sealing ring is a low-resistance body. As a result, electric charge generated on the sliding surface can be promptly removed. That is, the aforementioned sealing ring itself is configured by SiC, therefore enabling to serve as a conducting medium, which absorbs a large amount of electric charge compared with a SiC film. It is preferable that if the sealing ring is configured to be electrically contactable with conductive members such as a conductive housing, a conductive pressing spring, a conductive housing, and a conductive retainer, electric charge is released from the sealing ring to the conductive members. In addition, the specific resistance value of the entire sealing ring is low; therefore, the sealing ring can be easily configured to be electrically contactable with the conductive members.

In addition, as shown in FIG. 1, it has been confirmed that pores having an average diameter of 20 μm are formed on the sliding surface of the sintered compact of the composition B. Pores are scarcely confirmed in the sintered compacts of the compositions A and C; therefore, an average diameter of pores is assumed to be associated with an average diameter of aluminum oxide particles. Accordingly, it is preferable that the average diameter of the aluminum oxide particles as the Al additive is from 10 μm to 60 μm. If minute pores are exposed on the sliding surface, the sealed fluid, a lubricative agent, or the like penetrates into the pores, therefore improving a lubricating effect. Here, if the average diameter of the pores is smaller than 10 μm, the lubricating effect is less likely to improve. Meanwhile, if the average diameter of the pores is larger than 60 μm, strength around each of the pores is low, which may cause roughness on the sliding surface. Further, the sintered compact itself includes the pores. Therefore, even if the sliding surface becomes worn, new pores are exposed from the inside of the sealing ring. Consequently, an effect exerted by the pores may not deteriorate with age. Furthermore, the pores of the sintered compact itself are utilized; therefore, in addition to the fact that the foregoing effect exerted by the pores may not deteriorate with age, the sealing ring of the invention is easily manufactured compared with a sealing ring on which a vapor-deposited film including pores is deposited.

As described above, the embodiments of the present invention are described on the basis of the drawing; however, specific configurations may not be limited to these embodiments, and even changes or additions without departing from the scope of the present invention may be included in the present invention.

For example, the tandem-type mechanical seal device is explained as an example in the aforementioned embodiments, but not limited thereto. A case where sintered compacts each having a low specific resistance value of equal to or lower than 100 Ω·cm are applied to the rotating and stationary sealing rings is explained hereinbefore. Alternatively, one of the sealing rings, which is configured by a sintered compact having a low specific resistance value of equal to or lower than 100 Ω·cm may be combined with the other of the sealing rings where only a portion adjacent to the sliding surface has a low specific resistance value.

Further, boron carbide fine powder is explained hereinbefore as an example of the source B. Alternatively, a powder other than boron carbide fine powder may be applied to the source B. That is, a material may be preferably boron which functions as a sintering agent and from which a sintered compact having desired strength and hardness can be obtained.

Furthermore, water-soluble phenol resin is explained hereinbefore as an example of the source C. Alternatively, carbon black other than water-soluble phenol resin may be applied to the source C. That is, in a similar way as above, a material may be preferably carbon which functions as a sintering agent and from which a sintered compact having desired strength and hardness can be obtained.

In addition, aluminum oxide powder is explained hereinbefore as an example of the Al additive. Alternatively, aluminum nitride powder other than aluminum oxide powder may be applied as the Al additive. That is, a material may be preferably aluminum which functions as a body having a low electrical resistance and from which a sintered compact having a desired specific resistance value can be obtained.

REFERENCE SIGNS LIST

10 Stationary sealing ring
11 Rotating sealing ring

The invention claimed is:

1. A mechanical seal device for use in a water environment, comprising:
    a stationary sealing ring made of SiC; and
    a rotating sealing ring made of SiC and arranged opposite to the stationary sealing ring, the mechanical seal device bringing opposite sliding surfaces of the stationary sealing ring and the rotating sealing ring into close contact with each other to seal a sealed fluid such as ultrapure water or pure water that has a high specific resistance value,
    wherein at least one of the sealing rings including the sliding surfaces is configured by a sintered compact of a material including SiC as a base material compounded with an Al additive, and a specific resistance value of the sealing ring configured by the sintered compact including the sliding surface is equal to or lower than 100 Ω·cm, wherein the sealing ring including SiC is configured so that a ratio of the area of a 4H-polytype crystal structure included in the sliding surface is 25% or more relative thereto.

2. The mechanical seal device for use in a water environment according to claim 1, wherein the sealing ring is made of SiC including a 15R-polytype crystal structure.

3. The mechanical seal device for use in a water environment according to claim 2, further comprising:
    a sealing ring main body including the sliding surface of the stationary sealing ring; and
    a sealing ring main body including the sliding surface of the rotating sealing ring,
    wherein each of the sealing ring main bodies is configured by a sintered compact of a material including SiC as a base material compounded with an Al additive.

4. The mechanical seal device for use in a water environment according to claim 2, wherein at least one of the sealing rings is configured so that pores having an average diameter of 10 μm to 60 μm are exposed on the sliding surface of the sintered compact.

5. The mechanical seal device for use in a water environment according to claim 2, wherein at least one of the sealing rings is configured so that the Al additive is aluminum oxide particles having an average diameter of 10 μm to 60 μm.

6. The mechanical seal device for use in a water environment according to claim 2, wherein the sealing ring is the sintered compact of a material compounded with a source B of 0.05 wt % to 0.5 wt %, a source C of 1.0 wt % to 3.0 wt %, the Al additive of 0.25 wt % to 1.25 wt %, predetermined volumes of a binding agent, a dispersing agent and a parting agent, and SiC as a residual portion.

7. The mechanical seal device for use in a water environment according to claim 1, further comprising:
    a sealing ring main body including the sliding surface of the stationary sealing ring; and
    a sealing ring main body including the sliding surface of the rotating sealing ring,
    wherein each of the sealing ring main bodies is configured by a sintered compact of a material including SiC as a base material compounded with an Al additive.

8. The mechanical seal device for use in a water environment according to claim 7, wherein at least one of the sealing rings is configured so that pores having an average diameter of 10 μm to 60 μm are exposed on the sliding surface of the sintered compact.

9. The mechanical seal device for use in a water environment according to claim 7, wherein at least one of the sealing rings is configured so that the Al additive is aluminum oxide particles having an average diameter of 10 μm to 60 μm.

10. The mechanical seal device for use in a water environment according to claim 7, wherein the sealing ring is the sintered compact of a material compounded with a source B of 0.05 wt % to 0.5 wt %, a source C of 1.0 wt % to 3.0 wt %, the Al additive of 0.25 wt % to 1.25 wt %, predetermined volumes of a binding agent, a dispersing agent and a parting agent, and SiC as a residual portion.

11. The mechanical seal device for use in a water environment according to claim 1, wherein at least one of the sealing rings is configured so that pores having an average diameter of 10 μm to 60 μm are exposed on the sliding surface of the sintered compact.

12. The mechanical seal device for use in a water environment according to claim 11, wherein at least one of the sealing rings is configured so that the Al additive is aluminum oxide particles having an average diameter of 10 μm to 60 μm.

13. The mechanical seal device for use in a water environment according to claim 1, wherein at least one of the sealing rings is configured so that the Al additive is aluminum oxide particles having an average diameter of 10 μm to 60 μm.

14. The mechanical seal device for use in a water environment according to claim 1, wherein the sealing ring is the sintered compact of a material compounded with a source B of 0.05 wt % to 0.5 wt %, a source C of 1.0 wt % to 3.0 wt %, the Al additive of 0.25 wt % to 1.25 wt %, predetermined volumes of a binding agent, a dispersing agent and a parting agent, and SiC as a residual portion.

15. A sealing ring of a mechanical seal device for use in a water environment, comprising:
   a sliding surface, the sealing ring being configured by a sintered compact of a material including SiC compounded with an Al additive,
   wherein a specific resistance value of the sealing ring including the sliding surface is equal to or lower than 100 Ω·cm, wherein the sealing ring including SiC is configured so that a ratio of the area of a 4H-polytype crystal structure included in the sliding surface is 25% or more relative thereto.

* * * * *